United States Patent [19]
Leonard

[11] Patent Number: 5,526,637
[45] Date of Patent: Jun. 18, 1996

[54] BRUSH-CLEARING DEVICE

[76] Inventor: W. Burt Leonard, Rte. 1, Box 254, Waller, Tex. 77484

[21] Appl. No.: 383,011

[22] Filed: Feb. 3, 1995

[51] Int. Cl.$^6$ ................................................. A01D 34/00
[52] U.S. Cl. ............................ 56/16.4 R; 56/432; 37/301; 254/132
[58] Field of Search ..................... 56/16.4 R, 432, 56/DIG. 12, DIG. 13; 37/301, 302, 904; 254/132

[56] References Cited

U.S. PATENT DOCUMENTS

| | | | |
|---|---|---|---|
| 4,067,369 | 1/1978 | Harmon | 37/302 X |
| 4,321,761 | 3/1982 | Hedblum | 37/2 R |
| 4,372,063 | 2/1983 | Work | 37/301 |
| 4,488,586 | 12/1984 | Widegren | 144/363 |
| 4,547,984 | 10/1985 | Adams | 37/2 R |
| 4,846,445 | 7/1989 | Pfeffer | 254/132 X |
| 4,951,922 | 8/1990 | Brown, II | 254/154 |
| 5,067,261 | 11/1991 | Betts | 37/2 P |
| 5,111,599 | 5/1992 | DeSilvo et al. | 37/2 R |

*Primary Examiner*—Terry Lee Melius
*Attorney, Agent, or Firm*—William A. Knox

[57] ABSTRACT

A vegetation harvesting/clearing device consists of an assembly including a pair of hinged jaws and an open noose of cable, all of which is mounted on a load-lifting device of a prime mover such as a farm tractor. The open jaws are deployed to cause a patch of vegetation to be enclosed by the open noose. The jaws are closed around the vegetation, whereupon the noose is tightened to garrote the vegetation in a swath. The load lifting device raises the closed jaws to uproot the vegetation and to remove the swath of uprooted material to a disposal site where the swath is deposited.

10 Claims, 4 Drawing Sheets

BRUSH-CLEARING DEVICE

BACKGROUND OF THE INVENTION

1. Field of the Invention

A machine for use in land clearing by uprooting the vegetation, shaking off the dirt and disposing of the uprooted material.

2. Discussion of Related Art

There are a number of mechanized tools available for use in land-clearing operations. The tool design is often specialized appropriately for attacking a particular type of unwanted vegetation such as sod, mesquite, cactus, stumps, trees and the like. The tools are customarily mounted on a the front of a farm tractor. A brief review of typical known devices follows.

U.S. Pat. No. 4,321,761 issued Mar. 30, 1982 to S. Hedblom, teaches a two-member back-hoe-type tool that consists of a claw that is forced beneath the roots of a stump. A hydraulic jack, coupled between the claw and a second member resting on the ground beneath the stump, causes the claw to pull the stump upwards and out of the ground. An independently actuable cutting tool is provided to cut the stumps into manageable lengths.

In the above patent, no provision is made to clean up the resulting debris. One such device that could be used for cleanup is described in U.S. Pat. No. 4,488,586 issued Dec. 18, 1984 to L. Widegren for a stump shaker that removes dirt from an uprooted stump. The stump is grasped by hydraulically-actuated articulated fingers that swingingly impact the stump against a rigid framework to knock off the loose dirt. This tool has the disadvantage that the repeated impactive shocks ultimately results in framework destruction.

U.S. Pat. No. 5,067,261 issued Nov. 26, 1991 to J. G. Betts describes a grubbing tool having a vee-shaped opening that is designed to penetrate a little ways beneath the soil to cut and uproot the targeted vegetation. The device is said to be self cleaning.

U.S. Pat. No. 5,111,599 issued May 12, 1992 to S. DeSalvo et al. discloses a brush clearing implement that consists of a plurality of teeth along the leading edge of a cutter bar. Channels are defined by the adjacent teeth and shaped to provide a plurality of vee-shaped openings at the roots of the teeth to grasp small bushes while the forward ends of the teeth, being somewhat wider, accommodate larger stems or trunks. There appears to be no provision for removing the vegetation from between the teeth.

U.S. Pat. No. 4,547,984 issued Oct. 22, 1985 to R. D. Adams provides a claw, having three tines, mounted on the end of a long tool bar that is, in turn, coupled to a front-end loader of a farm tractor. In operation, the claw is lowered and forced beneath the roots of the brush. The tractor is then moved backwards to uproot the vegetation.

All of the brush-clearing tools known to Applicant require a separate piece of equipment for scavenging and depositing the uprooted brush and vegetation in/on a transporter means such as a truck or rail car for removal of the waste material to a disposal area. That requirement necessitates inefficient double-handling of the waste material. There is a need for a more efficient brush-disposal device.

SUMMARY OF THE INVENTION

The vegetation-harvesting and clearing tool consists of a jaw assembly including a pair of horizontally-disposed, pivotally-supported normally-open jaws that are mounted on a supporting means secured to the load-lifting assembly of a prime mover such as a tractor. The supporting means has a recess, to the opposite sides of which are attached the pivotally supported jaws. The jaws may be opened and closed by double-acting hydraulic pistons. A slack drawstring is threaded around the forward end portions of the jaws and loopingly extends rearwardly of the jaws into the recess. The load-lifting assembly positions the jaws near the ground surface whereupon the jaws are closed around a patch of vegetation with the slack drawstring looping anteriorly of the vegetation patch. The slack draw string is tightened to garrote the patch of vegetation, swathingly compressing the vegetation against the internal forward portion of the closed jaws. The load-lifting assembly is raised to uproot the vegetation from the ground and to deposit the uprooted vegetation at a waste-disposal means.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
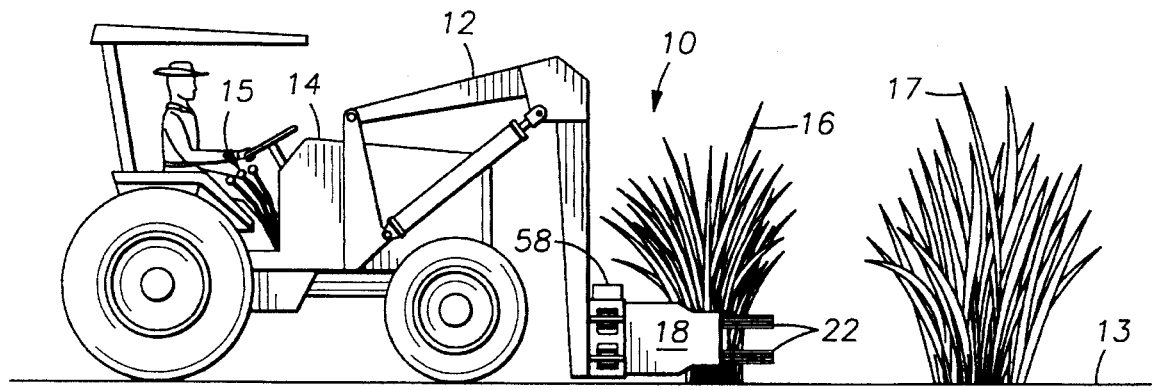
FIG. 1 is an overall view of the brush-clearing device attached to an exemplary farm tractor.
Figure 6:
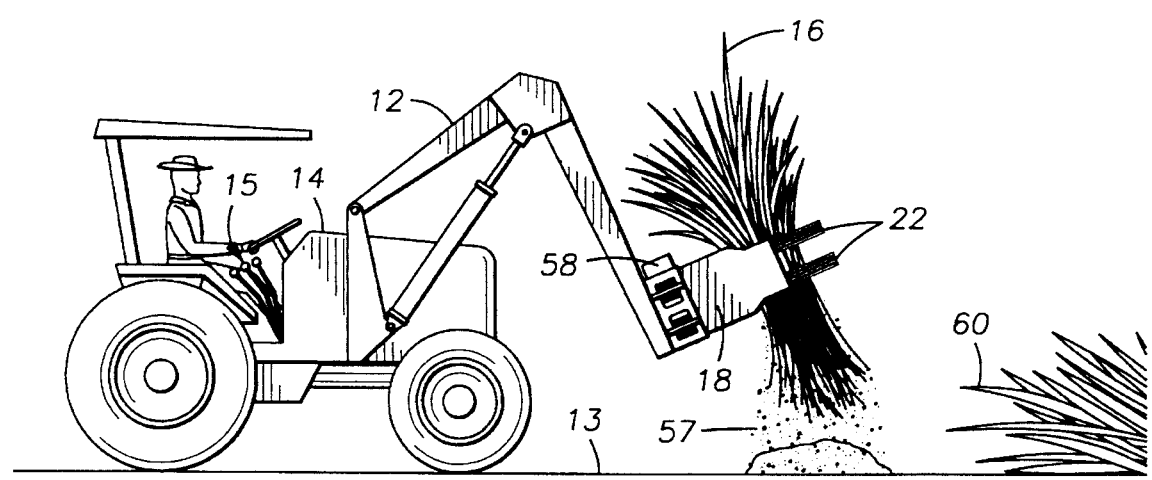
FIG. 6 illustrates the uprooted vegetation after transportation to a waste disposal site.

A device for harvesting vegetation and in particular for clearing brush from the ground is shown schematically in FIG. 1. The device consists of a jaw assembly generally shown as 10 that is secured to a hydraulically-actuated load-lifting assembly 12 such as, by way of example but not by way of limitation, the support arms for a front end loader. The load-lifting assembly 12 is hingedly fastened to a prime mover 14, such as a farm tractor of any well-known type. The vegetation-clearing or harvesting assembly 10 is designed to be pushed, with open jaws, against the lower trunks of scrub brush or other vegetation 16 and 17, near ground level 13. The jaws are closed to tightly embrace the enclosed brush growth. The jaw assembly is raised, thereby decoupling or uprooting the vegetation or brush growth from its growing medium such as the ground. A shaker, mounted on the jaw assembly is actuated to shake the dirt from the vegetation roots whereupon the prime mover 12 transports the uprooted brush to a waste-disposal facility of any desired type as shown by FIG. 6.

The configuration shown in FIG. 1 is exemplary only. The jaw assembly 10 could be mounted at the rear or on the side of tractor 12, on a truck, on a tracked vehicle, on a rail car or in place of the blade of a snow plow. An obvious modification of the jaw assembly could be used on the prow of a boat or barge for use in kelp harvesting in the open ocean. A lightweight version could be adapted for installation on a helicopter for use in remote areas or areas that are inaccessible to heavy ground equipment.

Figure 2:
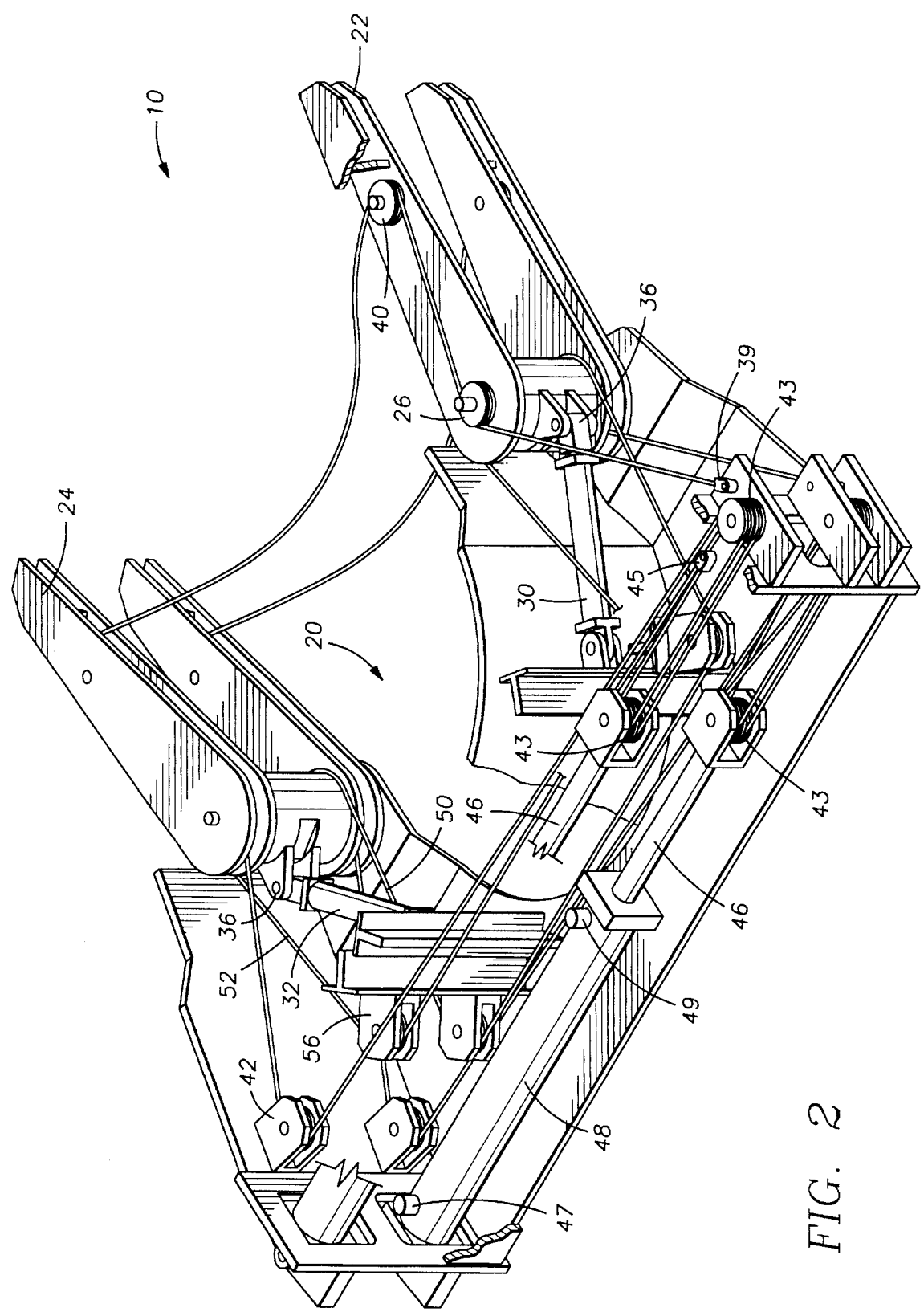
FIG. 2 is a perspective view, partly broken away, of the jaw assembly of the brush clearing device.
Figure 3:
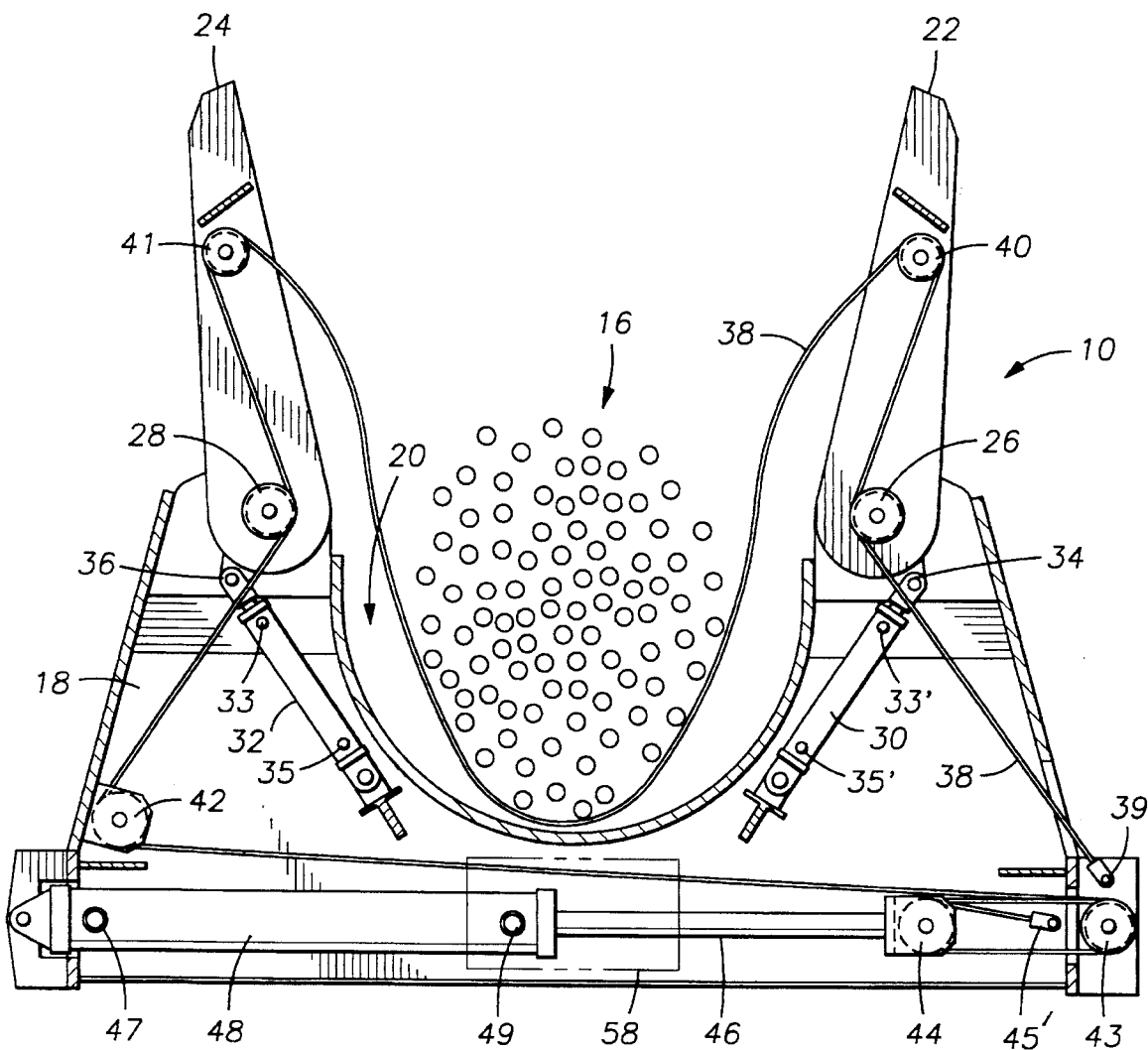
FIG. 3 illustrates the open jaws surrounding a patch of vegetation with the slack drawstring looped around the anterior portion of the patch.
Figure 4:
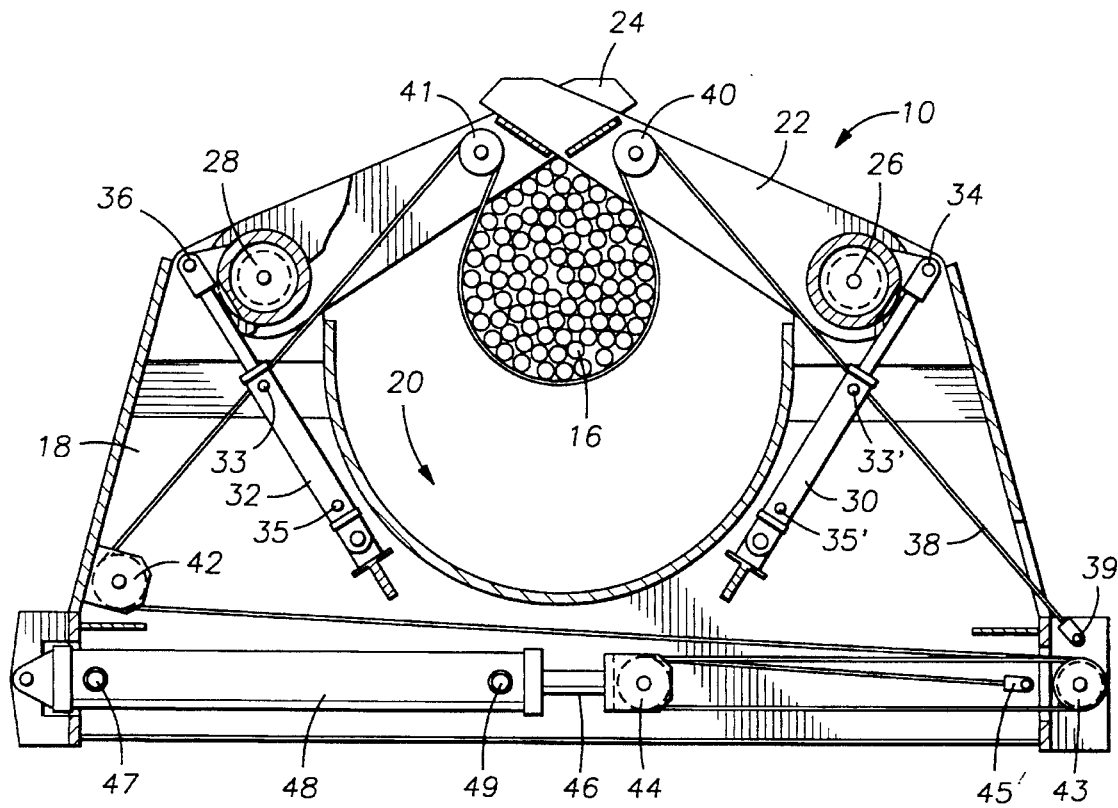
FIG. 4 illustrates the jaws closed to embrace the patch of vegetation with the drawstring tightened to garrote the vegetation in a swath.

FIG. 2 is a perspective view, partly cut away, of the jaw assembly 10. FIGS. 3 and 4 are plan views of the jaw assembly 10, with the top cover cut away to show essential details of construction. It is to be understood that the jaw assembly is a self-contained unit that, in an exemplary configuration, is designed to be fastened to the opposing arms of a conventional hydraulic lifting assembly of a tractor as shown in FIG. 1.

The jaw assembly consists of a supporting member 18, FIGS. 3 and 4, having a central open portion 20 about three feet across that may be semicircular by way of example but not by way of limitation. A pair of horizontally-disposed, pivotally-supported opposed jaws 22 and 24 are mounted on opposite sides of the central opening at the forward end of supporting member 18. Jaws 22 and 24 rotate around pivots 26 and 28 respectively. As will be described later, pivots 26 and 28 may be columnar and may include several cable-guiding pulleys. Jaws 22 and 24 are rotated by double-acting hydraulic actuators 30 and 32 of any well-known type. The piston-rod ends of the actuators are fastened to lugs 34 and 36 that are welded to jaws 22 and 24 near the periphery of the columnar pivots 26 and 28. Actuators 32 and 30 each include ports 33, 35, 33', 35' for admission of hydraulic fluid. Hydraulic lines, which are conventional, are not shown since their configuration would necessarily depend on the particular equipment and task to which the jaw assembly is to be applied.

Preparatory to attacking a patch of vegetation such as 16 and 17, jaws 22 and 24 are normally opened wide as shown in FIG. 3. When wide open, the tips of the jaws spread about five feet across.

There are two wire-rope cable circuits shown in FIG. 2. For simplicity of explanation, the cable circuits are shown separately in FIGS. 3–4 and in FIG. 5. In FIGS. 3–4 a first cable, 38, serves as a vegetation-garrotting drawstring or noose. Cable 38 is threaded from a first anchor 39, around a first pulley (not shown) associated with pivot 26 and around a second pulley 40 mounted on jaw 22. Cable 38 then extends loopingly rearward of the jaws and anteriorly to a patch of vegetation 16 such as brush. Thence, the cable is wrapped around a third pulley 41, passing over a fourth pulley associated with pivot 28 (not shown), to fifth and sixth pulleys 42 and 43, around sheave 44 and finally to a second cable anchor 45. Sheave 44 is secured to the end of piston rod 46 of double-acting hydraulic actuator 48 having hydraulic inlet ports 47 and 49. As with actuators 30 and 32, hydraulic plumbing is not shown.

In operation, referring now to FIGS. 3 and 4, with the jaws open as in FIG. 3, with the piston rod 46 of actuator 48 extended to render cable 38 slack, the jaw assembly is thrust into a patch of vegetation 16 with the cable looped anteriorly of the vegetation patch as shown. Jaws 22 and 24 are then closed by hydraulic actuators 30 and 32 as shown in FIG. 4. Piston rod 46 is retracted to tighten cable 38 around brush patch 16 thereby to garrote the brush against the inner surface of the closed jaws 22 and 24, thus forming a swath of vegetation. The jaw assembly 10 is raised upwardly by the lifting means 12 as shown in FIG. 6, thus decoupling (uprooting) the vegetation 16 from its growing medium such as the soil. The uprooted material 16 is then taken to a disposal area where the jaws are opened, the cable is slackened, and the material may be released into spoil heap 60.

Figure 5:
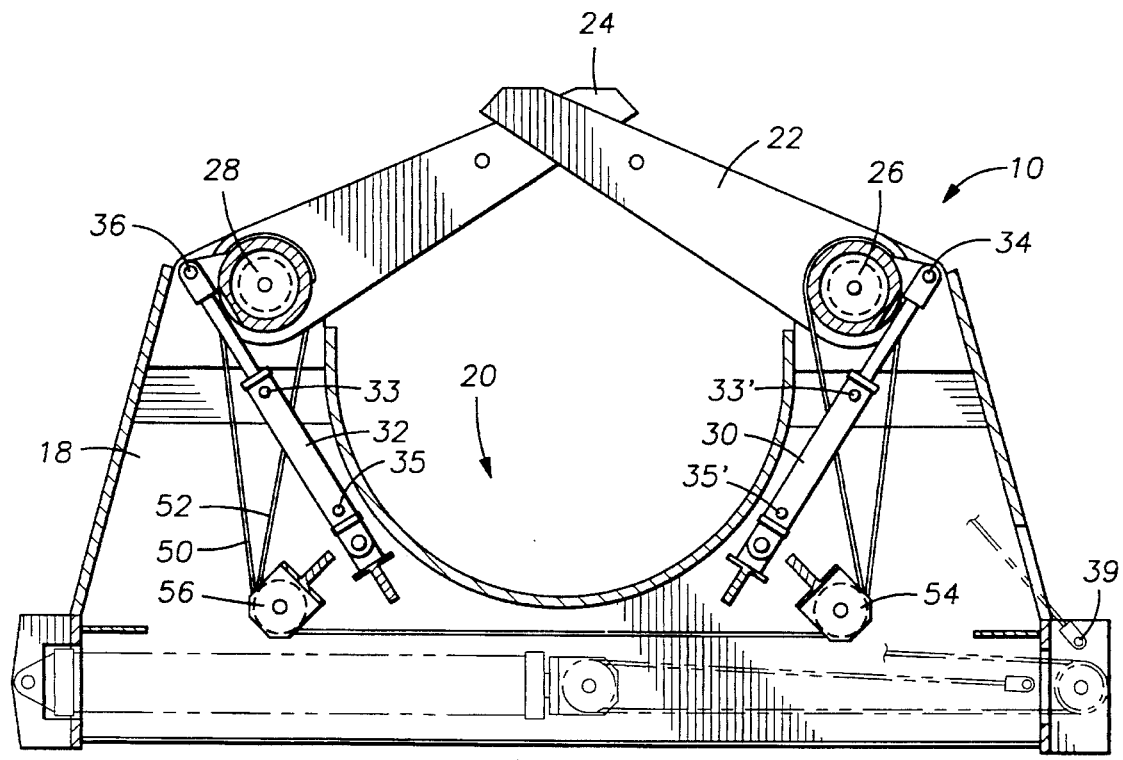
FIG. 5 shows the cable circuitry used to synchronize operation of the jaws.

Referring now to FIG. 5, jaws 22 and 24 are rotated independently by double-acting hydraulic actuators 30 and 32. To insure that the jaws rotate synchronously, they are fixedly interconnected by a static line such as 50 which passes over pulleys 56 and 54 between the two jaws. Thus, when piston 32 retracts to rotate jaw 24 counter-clockwise, cable 50 pulls against jaw 22 tending to urge that jaw to rotate clockwise in cooperation with the retraction of the piston rod of actuator 30. Cable 52 operates similarly.

It is useful to remove the dirt and loose sand or rocks such as 57, FIG. 6, from the uprooted vegetation 16 prior to disposition thereof in spoil heap 60. Preferably, a vibrator 58 of any well-known type is mounted on jaw support member 18. Any convenient type of vibrator may be used such as a rotary eccentric-weight vibrator may be operated by an hydraulic, variable speed motor. Use of a variable-speed motor permits application of a swept-frequency agitation to the material enclosed by the jaws. Heavy gobs of dirt may tend to respond better to low vibrational frequencies such as 3–20 Hz whereas higher frequencies on the order of 100 Hz may be more effective in dislodging lighter debris. Alternatively an electric motor or a programmed hydraulic servo vibrator system, such as is used for concrete tamping, could be used.

Sheave 44 and pulley 43 are shown as a double-sheave pulley system. Depending upon the stroke length of hydraulic actuator 46 and the total length of slack cable to be taken up, a single-sheave pulley system instead of a double-sheave system may prove to be preferable.

The drawstring is shown having a double-acting hydraulic cylinder 48 for taking up the slack as needed. Alternatively, an electrically or hydraulically-actuated cable winch (not shown) could be used for the same purpose and, indeed might prove preferable if a need for considerable amount of slack is anticipated.

Drawstring cable 38 is shown in FIG. 3–5 as being a single strand. As shown in FIG. 2, each jaw comprises a set of at least two members mounted vertically one over the other, perhaps eight to ten inches apart. A separate drawstring cable assembly is provided for each member of the jaw set. A dual drawstring encircling the vegetation minimizes the danger of severing the stems of the vegetation which an excessively-tightened single cable might tend to do.

Hydraulic lines and the required controls 15, FIGS. 1 and 6, are provided to interconnect the hydraulic system of the prime mover with the actuators associated with the jaw assembly in accordance with any well-known mechanical technique but, as earlier pointed out are not shown in detail because they are not germane to this invention and to avoid undue complications to the drawings. If desired, a self-contained hydraulic system could be provided to the jaw assembly although at the expense of increased weight and complexity.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A device for harvesting vegetation, comprising in combination:

a prime mover including a load-lifting means;

a jaw assembly means including a jaw support having a central open portion, the jaw support being coupled to said load-lifting means;

a pair of horizontally-disposed normally-open jaws having inner surfaces, the jaws being pivotally mounted on opposite sides of the central open portion of said jaw support means;

means associated with said load-lifting means for positioning the open jaw assembly to enable it to embrace a patch of vegetation and means for closing said jaws;

a draw-string threaded around the forward portion of the jaws for extension rearwardly into said central open portion of said jaw support means and anteriorly to the patch of vegetation embraced by the closed jaws;

means, mounted on said jaw support means, for tightening the draw-string to garrote the vegetation to swathingly compress the vegetation against the inner surface of the closed jaws;

means, associated with said load-lifting means, for raising the jaw assembly, thereby to decouple the swathingly-compressed vegetation from its growing medium and to transport said swathed vegetation to a disposal means.

2. The vegetation clearing device as defined by claim 1, further comprising;

vibrator means operatively coupled to the jaw support means for shaking debris from the swathed vegetation prior to disposal thereof; and control means for opening the jaws and slackening said draw-string to deposit said uprooted vegetation at a disposal area.

3. The vegetation clearing device as defined by claim 2, wherein:

said means for positioning and said means for raising, include preselected components of the load-lifting assembly.

4. The vegetation clearing device as defined by claim 2, wherein:

said draw-string is a cable.

5. The vegetation clearing device as defined by claim 2, further comprising:

a double-acting hydraulic actuator mounted on said jaw support means, operably coupled to each one of said horizontally-disposed opposed jaws for opening and closing each said jaw;

a double-acting cable takeup means coupled to said draw-string for tightening and slackening said draw-string.

6. The vegetation clearing device as defined by claim 5, wherein:

said double-acting takeup means includes a long-stroke double-acting hydraulic actuator.

7. The vegetation clearing device as defined by claim 2, wherein:

said vibrator means is a reciprocating hydraulic servo drive means.

8. The vegetation clearing device as defined by claim 2, wherein:

said vibrator means is comprised of a pair of rotating, eccentrically-mounted weights secured to said jaw support means.

9. The vegetation clearing device as defined by claim 6, wherein said double-acting takeup means is a cable winch.

10. A device for harvesting vegetation, comprising in combination:

a prime mover including a load-lifting means;

a jaw assembly means including a jaw support having a central open portion, the jaw support being coupled to said load-lifting means;

a pair of horizontally-disposed normally-open jaws having inner surfaces, the jaws being pivotally mounted on opposite sides of the central open portion of said jaw support means;

means associated with said load-lifting means for positioning the open jaw assembly to enable the jaw assembly to embrace a patch of vegetation and means for closing said laws;

means, mounted on said jaw assembly, for garroting the vegetation to swathingly compress the vegetation against the inner surface of the closed jaws;

means, associated with said load-lifting means, for raising the jaw assembly, thereby to decouple the swathingly-compressed vegetation from its growing medium and to transport said swathed vegetation to a disposal means.

* * * * *